3,138,524
PHARMACEUTICAL SUSPENSIONS
Margaret Rose Zentner, West Orange, N.J., assignor to Hoffmann-La Roche Inc., Nutley, N.J., a corporation of New Jersey
No Drawing. Filed June 6, 1962, Ser. No. 200,330
2 Claims. (Cl. 167—51.5)

The present invention relates to aqueous suspensions of 3-sulfanilamido-5-methyl-isoxazole. More particularly, the invention relates to aqueous suspensions of 3-sulfanilamido-5-methyl-isoxazole and sodium lauryl sulfate.

Aqueous suspensions of 3-sulfanilamido-5-methyl-isoxazole have proven to be unsatisfactory due to the fact that 3-sulfanilamido-5-methyl-isoxazole contains large quantities of tightly adsorbed air, which makes wetting of the particles extremely difficult; furthermore, the solids tend to agglomerate and the suspended particles settle out very rapidly.

This problem has now been overcome by the use of small quantities of sodium lauryl sulfate in the suspension. The 3-sulfanilamido-5-methyl-isoxazole suspensions of the invention contain substantially no adsorbed air, and give uniform suspensions that separate only very slowly upon standing.

The compositions of the invention contain from 0.01 to 0.1, preferably 0.02 to 0.06 part by weight of sodium lauryl sulfate and from 3 to 20, preferably 5 to 10 parts by weight of 3-sulfanilamido-5-methyl-isoxazole in the form of a finely divided powder. The parts by weight are based on the total volume of the aqueous suspension. Additionally, it has been discovered that the pH must be controlled within the range of 4.3 to 5.5, preferably 4.6 to 4.9, in order to obtain a stable suspension. The unadjusted pH of the solution will depend on the particular ingredients present in the suspension and the quantities of ingredients. Normally the pH is more acid than the required range, and accordingly, sufficient sodium hydroxide is added to bring the pH within the required range. Hence, another feature of the present invention is the use of sodium hydroxide in the suspension in a quantity necessary to bring the pH within the required range; generally from 0.2 to 0.3 weight percent of sodium hydroxide is employed for this purpose.

Other ingredients conventional in the pharmaceutical aqueous suspension art can be employed in the suspensions of the invention such as preservatives, e.g. sodium benzoate; sequestering agents, e.g. disodium Sequestrene; buffers, such as combinations of sodium citrate and citric acid; sweetening agents, such as sucrose, saccharin, sorbitol, sodium cyclohexyl sulfamate; flavoring agents, e.g. monosodium glutamate; anti-foaming agents; coloring agents; stabilizing agents, e.g. methylcellulose; thickening agents, e.g. high molecular weight carboxy vinyl polymers, etc.

The aqueous suspensions of the invention are useful in the same manner as 3-sulfanilamido-5-methyl-isoxazole itself is useful, i.e. in the treatment of bacterial infections, e.g. *E. coli, Staphylococcus aureus, Diplococcus pneumoniae*, etc.

The invention will be better understood from the following example which is given to illustrate the invention and not to limit it.

*Example*

A mixture of 290 ml. of distilled water, 10 g. of high molecular weight carboxy vinyl polymer (Carbopol No. 934), and 500 g. of sucrose are added together and heated to approximately 50–60° C. until solution is effected. To the solution maintained at this temperature a solution of 40 ml. of distilled water, 2.8 g. of sodium hydroxide, 2.5 g. of sodium benzoate, 0.1 g. of disodium Sequestrene, 4.4 g. of sodium citrate, 3.6 g. of citric acid, and 0.5 g. of monosodium glutamate are added with stirring. To the resulting mixture a suspension containing 80 ml. of distilled water, 0.25 g. of methyl cellulose, 0.03 g. of an emulsion of dimethyl polysiloxane (Antifoam C), 100 g. of sorbitol, 0.5 g. of sodium lauryl sulfate, and 102 g. of 3-sulfanilamido-5-methyl-isoxazole powder is added, and the mixture mixed thoroughly. Sufficient water is added to make 1.0 liter. The suspension has a pH of 4.6 to 4.75.

The resulting suspension can then be flavored and colored as desired.

I claim:
1. A suspension of 3-sulfanilamido-5-methyl-isoxazole in water comprising water, from 3 to 20% by weight of 3-sulfanilamido-5-methyl-isoxazole, from 0.01 to 0.1% by weight of sodium lauryl sulfate, and a sufficient quantity of sodium hydroxide to adjust the pH of the suspension to a pH in the range of 4.3 to 5.5; the percentages by weight being based on the total volume of suspension.
2. A suspension of 3-sulfanilamido-5-methyl-isoxazole in water comprising water, from about 5 to 10% by weight of 3-sulfanilamido-5-methyl-isoxazole, from about 0.02 to 0.06% by weight of sodium lauryl sulfate, and a sufficient quantity of sodium hydroxide to adjust the pH of the suspension to a pH in the range of 4.6 to 4.9.

References Cited in the file of this patent

UNITED STATES PATENTS

| | | |
|---|---|---|
| 2,742,396 | Sperandio et al. | Apr. 17, 1956 |
| 2,783,178 | White | Feb. 26, 1957 |
| 2,854,377 | Elias | Sept. 30, 1958 |
| 2,867,565 | Feinstone | Jan. 6, 1959 |
| 2,888,455 | Kano et al. | May 26, 1959 |
| 2,963,403 | Hiestand | Dec. 6, 1960 |